(12) United States Patent
Vrolijk et al.

(10) Patent No.: US 9,810,429 B2
(45) Date of Patent: Nov. 7, 2017

(54) GAS CONTROL UNIT OF MODULAR DESIGN AND MODULAR GAS CONTROL VALVE

(71) Applicant: ebm-papst Landshut GmbH, Landshut (DE)

(72) Inventors: Enno Jan Vrolijk, Dalen (NL); Roland Keber, Wörth a. d. Isar (DE); Hans-Joachim Klink, Erolzheim (DE)

(73) Assignee: ebm-papst Landshut GmbH, Landshut (DE)

( * ) Notice: Subject to any disclaimer, the term of this patent is extended or adjusted under 35 U.S.C. 154(b) by 63 days.

(21) Appl. No.: 14/771,948

(22) PCT Filed: Feb. 18, 2014

(86) PCT No.: PCT/EP2014/053090
§ 371 (c)(1),
(2) Date: Sep. 1, 2015

(87) PCT Pub. No.: WO2014/135365
PCT Pub. Date: Sep. 12, 2014

(65) Prior Publication Data
US 2016/0010860 A1    Jan. 14, 2016

(30) Foreign Application Priority Data

Mar. 8, 2013 (DE) .................. 10 2013 102 354

(51) Int. Cl.
*F23N 5/24* (2006.01)
*F23N 1/00* (2006.01)
(Continued)

(52) U.S. Cl.
CPC .............. *F23N 5/245* (2013.01); *F16K 27/00* (2013.01); *F16K 31/12* (2013.01); *F23D 14/36* (2013.01);
(Continued)

(58) Field of Classification Search
CPC .... F16K 31/12; F16K 27/00; F23K 29/05002; F23K 29/05001; G05D 7/005; F23N 1/007; F23N 5/245; Y10T 137/87917
(Continued)

(56) References Cited

U.S. PATENT DOCUMENTS 3,877,475 A    4/1975 Dietiker
4,424,830 A *  1/1984 Arnsperger et al. .... F23N 1/005
                                                137/269
(Continued)

FOREIGN PATENT DOCUMENTS

DE        2501891 A1    7/1976
DE   102007022008 A1   11/2008
(Continued)

OTHER PUBLICATIONS

International Search Report (in German with English Translation) for PCT/EP2014/053090, dated May 28, 2014; ISA/EP.

*Primary Examiner* — Kevin Lee
(74) *Attorney, Agent, or Firm* — Harness, Dickey & Pierce, P.L.C.

(57) ABSTRACT

The invention relates to a gas control unit of modular design, in particular for controlling the quantity of gas to be fed to a gas burner, having a pneumatically controlled gas control valve that is configured as a whole as a module and is usable in such a gas control unit of modular design together with a gas safety valve.

10 Claims, 3 Drawing Sheets

(51) Int. Cl.
*F16K 27/00* (2006.01)
*F23N 5/10* (2006.01)
*F23D 14/36* (2006.01)
*F16K 31/12* (2006.01)
*G05D 7/00* (2006.01)

(52) U.S. Cl.
CPC ............. *F23N 1/007* (2013.01); *F23N 5/107* (2013.01); *G05D 7/005* (2013.01); *F23K 2900/05001* (2013.01); *F23K 2900/05002* (2013.01); *F23N 2035/16* (2013.01); *F23N 2035/24* (2013.01); *Y10T 137/87917* (2015.04)

(58) Field of Classification Search
USPC ................................. 137/613, 454.2, 454.6
See application file for complete search history.

(56) References Cited

U.S. PATENT DOCUMENTS

| | | | |
|---|---|---|---|
| 4,462,566 A * | 7/1984 | French | G05D 7/005 137/501 |
| 5,989,014 A | 11/1999 | Invernizzi | |
| 6,793,199 B2 * | 9/2004 | Bushik et al. | F23N 1/005 251/367 |
| 6,832,628 B2 * | 12/2004 | Thordarson et al. | G05D 7/0106 137/488 |
| 8,550,112 B2 * | 10/2013 | Bertelli | F23N 1/005 137/487.5 |
| 9,416,888 B2 * | 8/2016 | Keber et al. | F16K 31/04 |
| 2001/0002595 A1 | 6/2001 | Pappalardo et al. | |
| 2004/0069355 A1 | 4/2004 | Sollier | |
| 2010/0269931 A1 | 10/2010 | Seebauer | |
| 2013/0314469 A1 | 11/2013 | Chang | |

FOREIGN PATENT DOCUMENTS

| | | |
|---|---|---|
| DE | 102012102645 A1 | 10/2013 |
| EP | 0834695 A1 | 4/1998 |
| EP | 1106923 A2 | 6/2001 |
| EP | 2048439 A1 | 4/2009 |
| WO | WO-02070936 A1 | 9/2002 |

* cited by examiner

GAS CONTROL UNIT OF MODULAR DESIGN AND MODULAR GAS CONTROL VALVE

CROSS REFERENCE TO RELATED APPLICATIONS

This application is a U.S. National Phase Application under 35 U.S.C. 371 of International Application No. PCT/EP2014/053090 filed on Feb. 18, 2014 and published in German as WO 2014/135365 A1 on Sep. 12, 2014. This application is based on and claims the benefit of priority from German Application No. 10 2013 102 354.1 filed on Mar. 8, 2013. The entire disclosures of all of the above applications are incorporated herein by reference.

FIELD

The invention relates to a gas control unit of modular design, in particular for pneumatically controlling the quantity of gas to be fed to a gas burner, having a pneumatically controlled gas control valve that is configured as a module.

BACKGROUND

Various gas control valves and gas safety valves are known in the prior art for use in gas/air mixing units and particularly in gas burners. European Patent Application EP 0 834 695 A1 discloses a mixing device for gas burners, in whose housing electromagnetically operated closing elements are arranged in order to open and to close a gas flow leading to a valve seat. The valve seat itself is here formed by the housing and by sections of the mixing device configured thereon to form a single piece. By using parts of the housing of the mixing device as valve seat, said valve seat must be configured with a special surface at least in this area, in order to be able to ensure the sealing. After the production of the housing, this usually requires expensive post-processing on the valve seat.

A combined air/gas valve unit in an electronically controlled form is disclosed in DE 10 2007 022 008 A1.

Finally, from EP 2 048 439 A1, it is also known to integrate a gas controller with a valve body in a radial fan housing, and to arrange the valve seat of the entire controller directly on a housing part located in the interior.

However, the disadvantage of the known solutions is that the gas control valves or gas safety valves have to be adapted especially to a certain housing shape of the mixing device or of the fan and can be used in each case only for this one product. The electronically controlled gas valves are clearly more cost intensive both with respect to the component itself and also with respect to the electronic control necessary. For each design type, special production devices have to be adapted.

SUMMARY

Based on this problem, the aim of the invention is to achieve a cost effective gas control unit and a gas control valve that can be used therein, which are capable of being used in various housing types, in particular in mixing devices or fans. Furthermore, the aim of the invention is to reduce the installation time of the units that ensure the gas control and to design them so that they can be replaced easily.

According to the invention, a pneumatic, i.e., a pneumatically controlled modular gas control valve is combined together with a gas safety valve having a modular configuration to form a gas control unit of a modular design, in particular in order to control a quantity of gas to be fed to a gas burner. The gas control valve configured as a module is here arranged in series with the gas safety valve that is configured as a module, in such a manner that the gas safety valve is located before the gas control valve seen in the flow direction.

As a result of the use of two components each of modular design, the development time is reduced, since each module needs to be developed only once, but later can also be used in different end products, for example, in fan housings, gas valve housings or gas/air manifolds. Furthermore, each one of the modules can be produced separately and its operation can be tested, wherein the test devices for the modular valves can be substantially smaller than those that had to be used in the prior art for the components as a whole, for example, fan housing with safety valves arranged thereon and with a gas control valve.

Another advantage of the modular design is that several of the respective gas control valves and gas safety valves formed as modules can be attached in parallel to the respective end products and thus higher performances and modulation ranges can be achieved in a simple and cost effective manner.

In a preferred embodiment, only a single gas safety valve is provided for the gas control unit and said valve is configured as a coaxial double safety valve. Thus, it would be possible to meet the need for double sealing of components arranged in the gas path without requiring a large installation space for this purpose, as is the case when two separately arranged safety valves are used. Furthermore, it is advantageous here to design the gas safety valve as a coaxial valve, because said valve is constructed in a particularly compact manner and the necessary surface on the component on which the valves are arranged in the end is smaller in comparison to the solutions known from the prior art.

In addition to the pneumatically controlled gas control valve, it is preferable that the gas safety valve also comprises a cartridge-like housing with means for detachable attachment on a gas valve housing, fan housing or manifold. Furthermore, in an advantageous embodiment, it is provided that, on the cartridge-like housing parts of the two modular valves, sealing means that are arranged in each case on the outside are provided for sealing the modules on the gas valve housing, fan housing or manifold. Due to the cartridge-like design of the respective housing, this can occur in the form of cost effective sealing rings that are introduced in a sealing manner between the gas valve housing, fan housing or manifold and the respective module.

Furthermore, it is advantageous that on the gas valve housing, fan housing or manifold, no special requirements are necessary in terms of the constitution of the material or surface, since both the leak prevention and also the gas control occur exclusively via the modular gas safety valves and the gas control valve. It is only necessary to provide a respective receiving area that fits the modules or cartridge-like housings, and into which the respective module is inserted and detachably attached therein. In a particularly simple design, the valves of modular design and the gas valve housing, fan housing or the manifold in each case have mutually fitting threads.

However, other attachment types are also possible, such as flange screw connections, clip connections, plug-in connections or other solutions known in the prior art.

A combined unit consisting of a gas valve housing, a fan housing or a manifold, with the pneumatically controlled gas control valve that is configured as a module and the gas safety valve that is configured as a module, is at least 30% smaller in terms of its construction size than corresponding units used to date, in which the gas control valves and gas safety valves are inserted using a nonmodular design. When using a double safety valve in a coaxial design, wherein a second safety valve is dispensed with, the overall construction size reduction is at least 40% in comparison to the solutions known from the prior art.

"Replaceable module" is understood to mean that the pneumatically controlled gas control valve is configured as an independent component and can be combined with other components. Due to the design as a module, the gas control valve can be attached via a fitting interface to any components provided for that purpose and removed again.

In a preferred embodiment, at least part of the housing of the pneumatically controlled gas valve is configured as an insert cartridge, as a result of which the gas control valve module has a compact construction and can be inserted or screwed into housings of fan devices or gas/air mixing devices. Here it is advantageous if, on the housing configured as an insert cartridge, on the outside, a thread, a flange and/or a similar detachable attachment means is provided. It is also advantageous that the components that determine the gas flow or the gas quantity are accommodated in such an insert cartridge, and are thus in the gas flow path when the cartridge is screwed into the corresponding housing. The modules of both the gas control valve and also of the gas safety valve are in each case designed with inclusion of valve body and valve seat, so that the production quality of the usually metal housing in which it is attached is less critical. The "insert cartridge" is configured as a housing part that is suitable for insertion into another component, without having to provide further construction-related measures on the other component, in addition to a corresponding shape adaptation. The pneumatically controlled gas control valve is configured as servo pressure controller and it comprises a valve body which is held by a membrane and pressed by a spring into a closed position in the resting state. The open position and thus the gas quantity passing through the gas control valve are determined pneumatically via the negative pressure generated by the connected fan and the gas pressure acting in the opposite direction. As a result of the special method of action, the housing, the valve body and the peripheral valve gap opened for the gas path on the valve seat can also be dimensioned in such a manner that, in the case of a small housing diameter, a comparatively large valve gap can be formed. Preferred sizes here are, 30-50 mm for the outer diameter of the housing, 5-15 mm for the outer diameter of the valve body and 3-5 mm for the peripheral valve gap opened for the gas path on the valve seat.

Other advantageous embodiments of the invention are characterized in the dependent claims and represented in further detail below together with the description of the preferred embodiment of the invention in reference to the figures.

DRAWINGS

FIG. 1b shows a front sectional view of the pneumatically controlled gas control valve of FIG. 1a;

FIG. 3b shows a front sectional view of the gas control unit of FIG. 3a.

DESCRIPTION

Figure 1A:
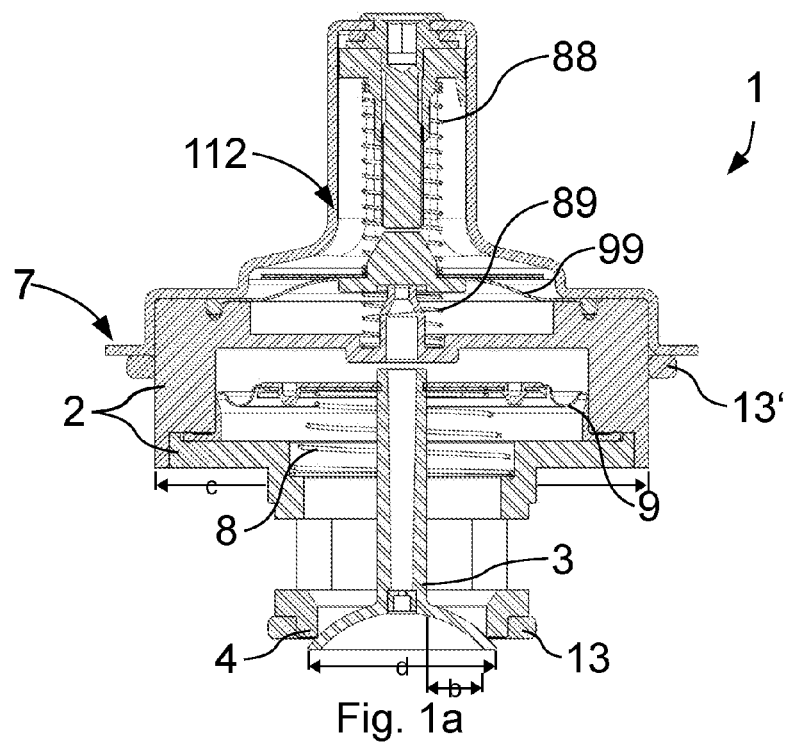
FIG. 1a shows a lateral sectional view of a pneumatically controlled gas control valve.

The figures diagrammatically show the components necessary for understanding the invention, as an example, where identical components are marked with respective identical reference numerals.

Figure 1B:
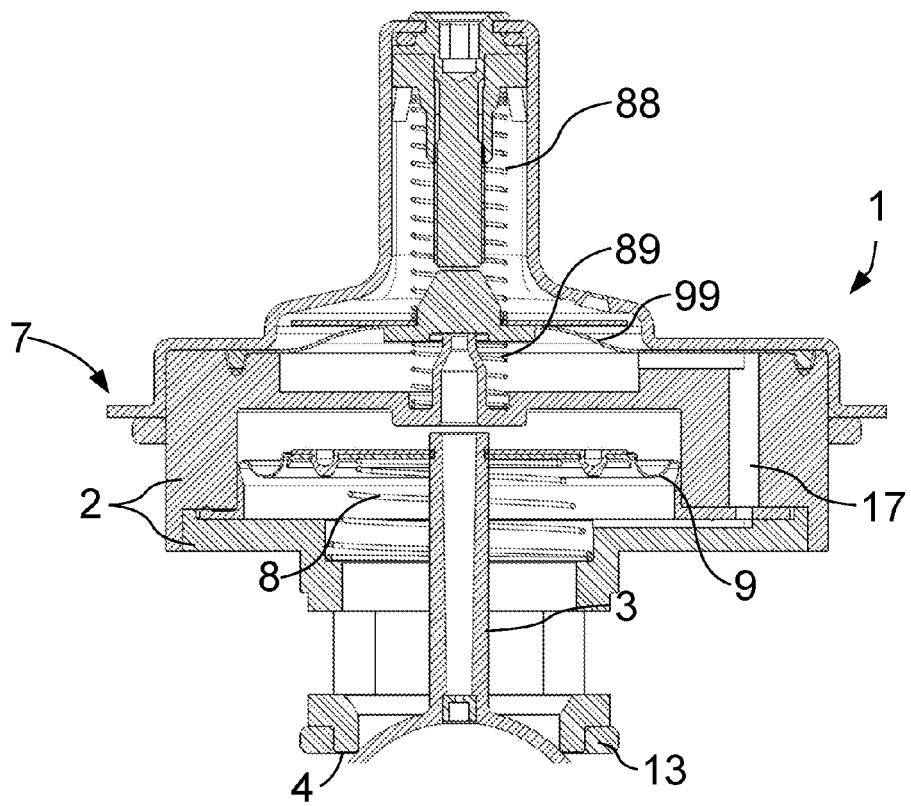

Shown in FIGS. 1a and 1b is a pneumatically controlled gas control valve 1 with gas pressure controller 111 and auxiliary pressure controller 112, which together form a servo pressure controller. The gas control valve 1 is configured as a whole as a replaceable module, wherein the lower constitutive part of the housing 2, which is part of the module, is inserted into the respective end product (for example, gas valve housing 30, fan housing 40, manifold 330) and attached therein. The housing 2 is formed for this purpose as a cartridge 7, which, during operation, is arranged in the area of the gas flow. In the cartridge 7, the components that pneumatically control the gas quantity versus time are accommodated.

A valve body 3 of hollow design is held in the cartridge-like housing 2 by a membrane 9, where the membrane 9 is attached to the housing 2 and forms a flat delimitation with respect to the auxiliary pressure controller 112. A channel 17 (FIG. 1b) connects the area of the auxiliary pressure controller 112 to the area of the gas pressure controller 111, so that the components (springs 88, 89; membrane 99) can have a supporting effect on the auxiliary gas pressure controller 111 and thus the control of the valve body 3 can be adjusted exactly. The housing 2 has a section extending in the radial direction toward the center, which forms the valve seat 4 for the valve body 3. Between the housing 2 and the membrane 9, a spring 8 is arranged, which acts in the axial direction on the valve body 3 and presses said valve body against the valve seat 4. On the housing 2, seals 13, 13' are provided, which seal the cartridge-like housing 2 in the installed state. The negative pressure generated by the connected fan 200 (FIGS. 3a, 3b) acts on the valve body 3 in the opposite axial direction and brings the gas control valve 3 against the spring force of the spring 8 into an open position, so that gas is mixed with the air flow suctioned by the fan 200.

The housing 2 has an outer diameter c of 50 mm, the valve body has an outer diameter d of 25 mm, and the peripheral valve gap b which is opened for the gas path on the valve seat 4 has an opening width of 5 mm.

Figure 2:
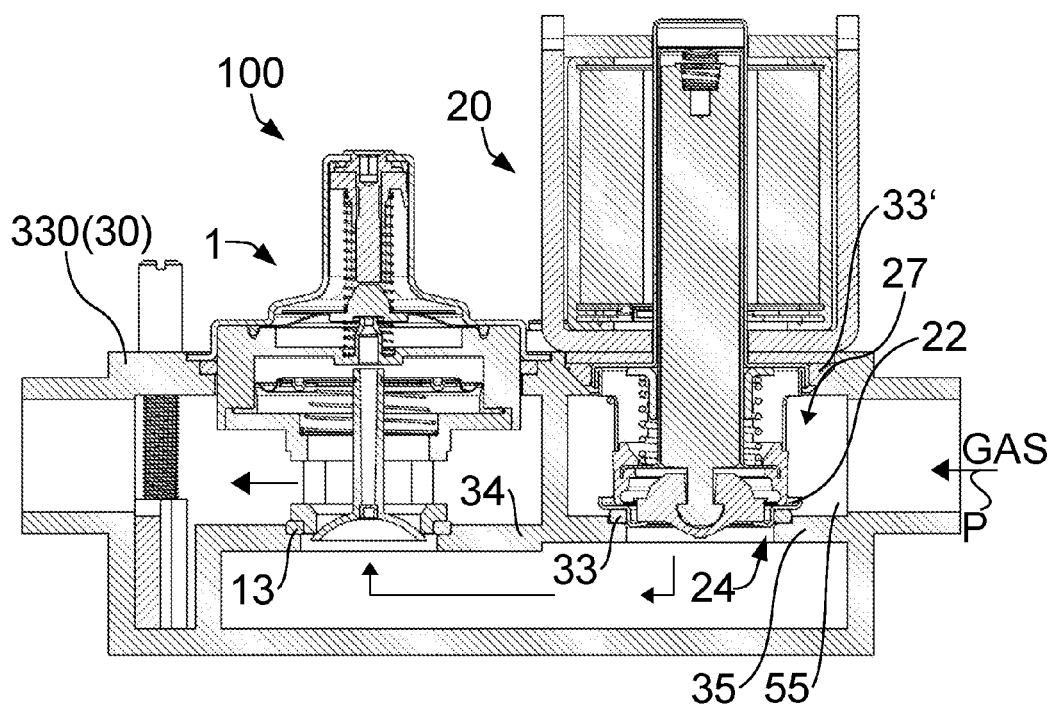
FIG. 2 shows a lateral sectional view of a gas control unit with a pneumatically controlled gas control valve on a manifold.

Represented in FIG. 2 is a gas control unit 100 for the control of the gas quantity to be fed to a gas burner on a manifold 330, whose upstream extent from the fan and downstream extent toward the burner are not shown. In the design according to FIG. 2, the pneumatically controlled gas control valve 1 from FIG. 1a, which is configured as a module, and a gas safety valve 20 which is configured as a module are arranged in series, wherein, seen in the flow direction, the gas safety valve 20 is located before the pneumatically controlled gas control valve 1. Both the gas control valve 1 and also the gas safety valve 20 are detachably attached in a manifold 330 or its housing. In comparison to the solutions already known from the prior art, both valves 1 and 20 are configured as modules, so that they do not put high requirements on the housing of the manifold 330, except for the attachment means to be provided for the attachment. Only the space 55 has to meet increased requirements. The gas safety valve 20 is configured as a coaxial double safety valve, so that a single gas safety valve 20 is sufficient in order to meet the legally prescribed double protection against gas outflow. The gas safety valve 20 also has an insert cartridge 27 arranged in the gas valve 30 and formed by the lower section of the housing 22. The manner of electronically operating such gas safety valves 20, in order to detach the valve body 23 from the valve seats 24 and in order to ensure the double protection via the springs, is known from the prior art. The use according to the invention of an insert cartridge 27 on the gas safety valve 20 makes it possible for said valve to be inserted in a modular manner into the manifold 330 and attached thereto. As attachment means, it is possible to attach additional screws, or to provide mutually engaging threads directly on the insert cartridge 27 and the gas valve housing 330. Alternatively, a press fitting of the components is also possible. Furthermore, the cartridge used 27 is sealed twice via sealing means 33 and 33' on the manifold 330. The gas thus enters the insert cartridge 27, as represented by arrow P, from the right sideways and, in the case of a valve body detached from the valve seat, it is pressed by the supplied gas pressure toward the gas control valve 1. There, it passes through the valve seat and is led to the gas outlet. In FIG. 2, the gas valve 1 is in closed position. For the definition of the gas path, the housing of the manifold 330 has corresponding bars 34, 35 which receive the modules, on which bars the insert cartridges 7 and 27 are applied in each case in a sealing manner. Even though FIG. 2 shows an arrangement of the gas control unit on a manifold 330, said unit can be attached identically to a gas valve housing 30.

Figure 3A:
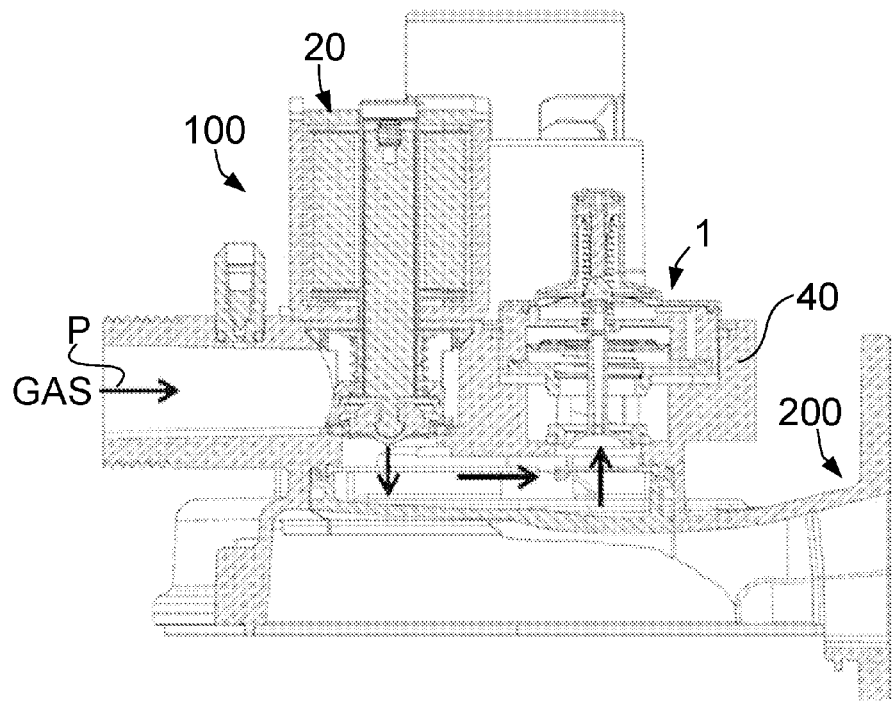
FIG. 3a shows a lateral sectional view of the gas control unit of FIG. 2 on a fan housing.
Figure 3B:
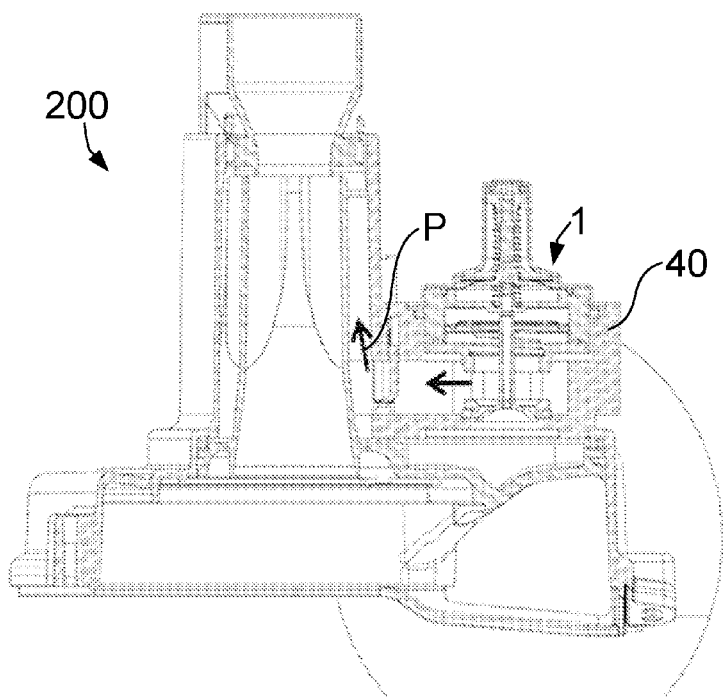

FIGS. 3a and 3b show a lateral and a front sectional view of the gas control unit 100 with gas valve 1 and gas safety valve 20 from FIG. 2 in a state installed on a fan housing 40. The control of the open position of the gas control valve 1 and thus of the quantity of gas fed to the connected fan 200 occurs exclusively by the control variables, gas pressure and above all air pressure. The gas pressure acts against the valve body 3 and, in addition to the spring force of the spring 8, it pushes said body into a closed position. The arrangement of the gas control valve 1 of the gas control unit 100 occurs in the area of a Venturi nozzle of the fan 200, where the negative pressure (−p) generated by the fan 200 is lowest. The rotation speed-dependent negative pressure of the fan 200 acts on the membrane 9 of the gas control valve 1 and opens and detaches the valve body 3 from the valve seat 4 against the above described closing forces in a predefined manner, wherein the control of the opening position of the valve body 3 can be preset via the characteristics of the individual components (spring, membrane, valve body) of the gas control valve 1. The provision of the quantity of the gas via the gas safety valve 20 and the rotation speed of the fan 200 are controlled electronically. The gas flows in arrow direction P from the gas inlet via the gas safety valve 20, the gas control valve 1 into the fan 200.

As a result of the modular design of the gas control valve 1 and of the entire gas control unit 100, a particularly compact installation possibility directly on the fan 200 is made possible. In addition, the modules can also be exchanged individually for maintenance or if necessary for other reasons. The modules of the gas control valve 1 and gas safety valve 20 are each designed with inclusion of valve body and valve seat, so that the production quality of the metal fan housing 40 is less critical.

The invention claimed is:

1. A gas control unit of modular design for pneumatic control of a quantity of gas to be supplied to a gas burner, the gas control unit comprising a gas control valve that is configured as a module and at least one gas safety valve configured as a module;

the gas control valve comprising a housing with a gas inlet, a valve body held in the housing and arranged movably in an axial direction, a valve seat, and a spring which acts in the axial direction on the valve body, wherein the gas control valve is pneumatically controlled and configured as a whole as a replaceable module.

2. The gas control unit according to claim 1, wherein the pneumatically controlled gas control valve that is configured as a module and the gas safety valve configured as a module are arranged in series, and the at least one gas safety valve is arranged before the gas control valve in a gas flow direction.

3. The gas control unit according to claim 1, wherein the gas safety valve that is configured as a module comprises a housing, a valve body and at least one valve seat, wherein the at least one valve seat is formed by parts of the housing.

4. The gas control unit according to claim 1, wherein a single gas safety valve is provided and said single gas safety valve is configured as a double safety valve.

5. The gas control unit according to claim 1, wherein the pneumatically controlled gas control valve that is configured as a module and the gas safety valve that is configured as a module each comprise cartridge-like housing parts with means for a detachable attachment on a gas valve housing, fan housing or manifold.

6. The gas control unit according to claim 5, wherein, on the cartridge-like housing parts, sealing means that are arranged in each case on an outside are provided for sealing the modules on the gas valve housing, fan housing or manifold.

7. The gas control valve according to claim 1,
wherein at least part of the housing is configured as an insert cartridge.

8. The gas control valve according to claim 1, wherein the valve seat is formed by parts of the housing of the gas control valve.

9. A fan housing, gas valve housing or manifold comprising a gas control unit according to claim 1.

10. A fan housing, gas valve housing or manifold comprising a gas control valve according to claim 1.

* * * * *